United States Patent [19]

DeLuca et al.

[11] Patent Number: 5,333,098

[45] Date of Patent: Jul. 26, 1994

[54] SHOCK ABSORBING APPARATUS FOR MOUNTING A PLURALITY OF STORAGE DEVICES IN A STACKED CONFIGURATION

[75] Inventors: Alfred E. DeLuca, Harvard; Stanley W. Stefanick, Uxbridge; Cosmo L. Leo, Watertown; Thomas J. Orr, Sudbury; David T. Symmes, Danvers; Henry Wright, Ipswich, all of Mass.

[73] Assignee: Digital Equipment Corporation, Maynard, Mass.

[21] Appl. No.: 166,284

[22] Filed: Dec. 13, 1993

Related U.S. Application Data

[63] Continuation of Ser. No. 829,645, Feb. 3, 1992, abandoned.

[51] Int. Cl.⁵ .......................... H05K 7/12; G06F 1/16; F16M 13/00
[52] U.S. Cl. .................................. 361/685; 248/632; 248/634
[58] Field of Search ...................... 364/708.1; 248/632, 248/634, 638, 573; 360/97.01, 98.01, 137; 361/679, 683–685, 724, 735, 825–829

[56] References Cited

U.S. PATENT DOCUMENTS

| | | | |
|---|---|---|---|
| 2,470,185 | 5/1949 | Pietz | 248/632 X |
| 3,997,819 | 12/1976 | Eggert et al. | 361/394 X |
| 4,214,738 | 7/1980 | Casper | 248/573 X |
| 4,549,602 | 10/1985 | Espinoza | 361/383 X |
| 4,705,257 | 11/1987 | Leo et al. | 248/638 X |
| 4,713,714 | 12/1987 | Gatti et al. | 360/137 |
| 4,754,397 | 6/1988 | Varaiya et al. | 360/920 X |

Primary Examiner—Leo P. Picard
Assistant Examiner—Michael W. Phillips
Attorney, Agent, or Firm—Albert P. Cefalo; Ronald C. Hudgens; Barry N. Young

[57] ABSTRACT

A storage assembly for mounting "0" to "N" storage devices to a computer or electronic system. The storage assembly has an assembly base that connects to the housing of the system, "1" to "M" tray members that support "0" to "N" storage devices with the "1" to "M" tray members being connected such that they form a stack of tray members and each tray member has a least one storage device attached to it, shock mount assemblies for movably attaching the stack of tray members with the storage devices attached thereto to the base and for protecting the tray members of storage devices from normal shocks and vibrations, and severe shocks in the horizontal, vertical, and angular directions, 97 LDC board that provides regulated power to the storage devices, an interface board for transferring data to, and receiving data from, the storage devices via a cable assembly that connects to the storage devices in a daisy chain fashion, and 9 connector that connects to the interface board and the storage devices that permits connection of the storage devices and interface board to external devices.

24 Claims, 4 Drawing Sheets

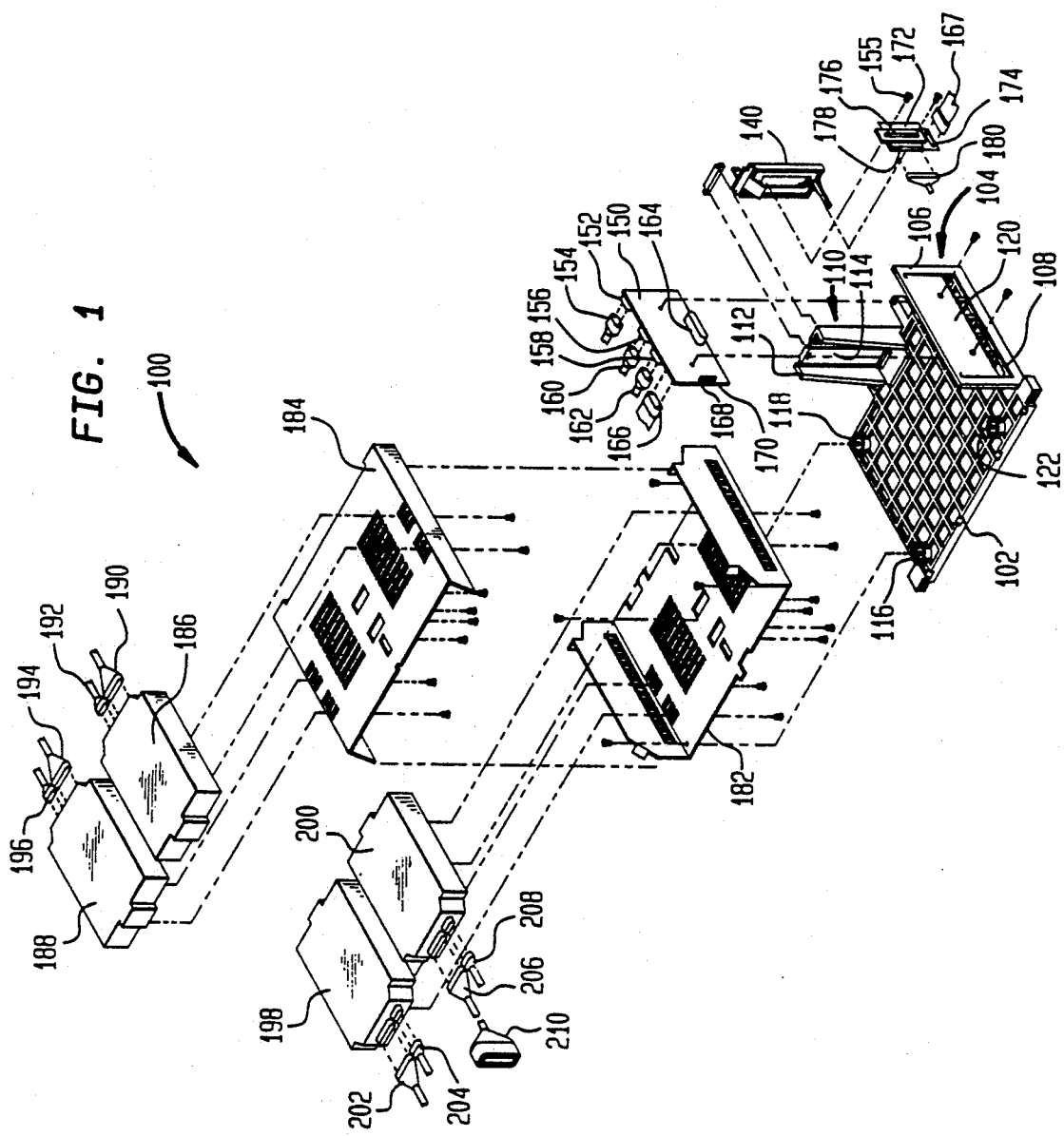

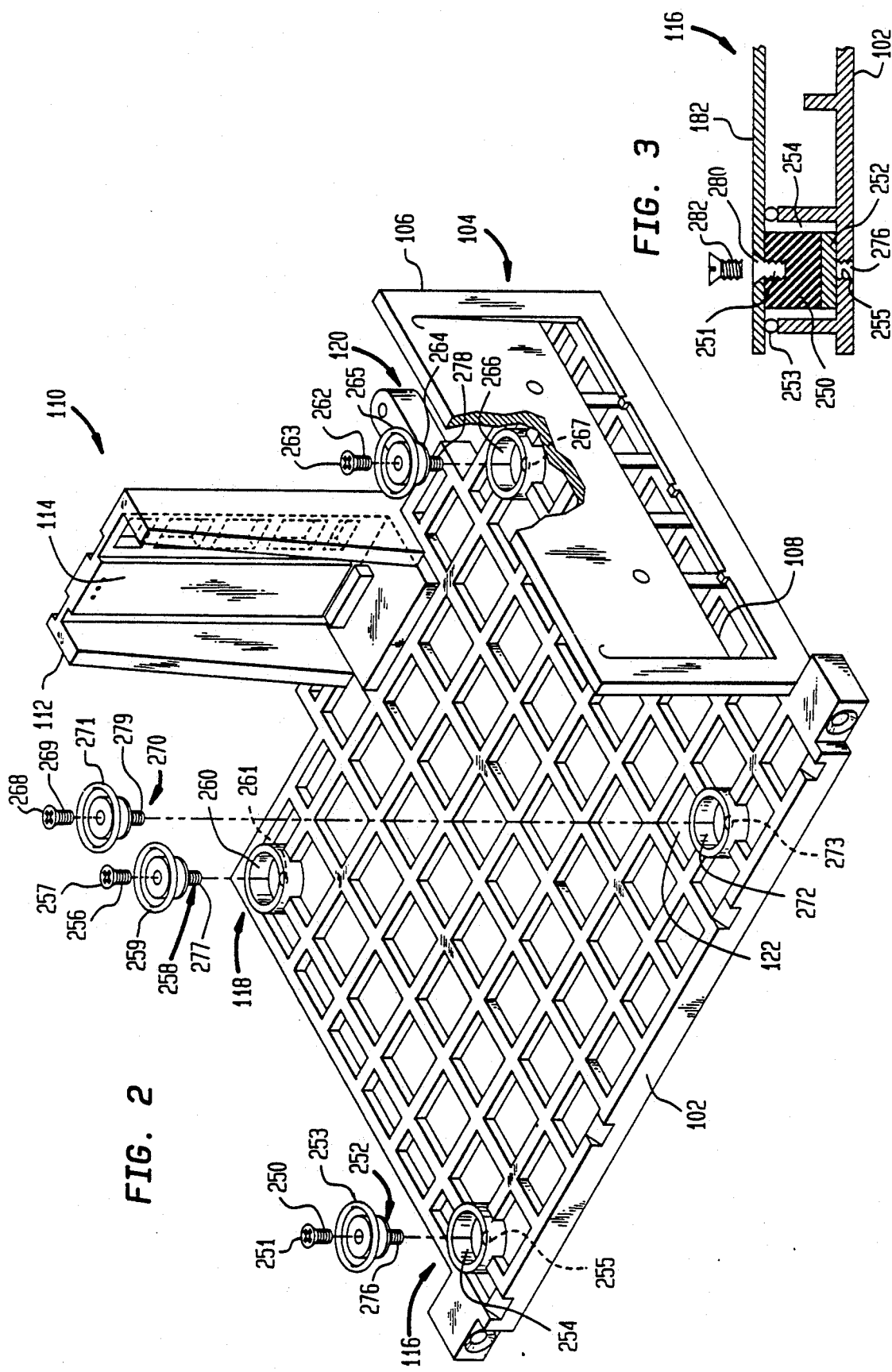

SHOCK ABSORBING APPARATUS FOR MOUNTING A PLURALITY OF STORAGE DEVICES IN A STACKED CONFIGURATION

This is a continuation of application Ser. No. 07/829,645 filed on Feb. 3, 1992, now abandoned.

FIELD OF THE INVENTION

The present invention relates to assemblies that are used to mount storage devices within an enclosure that houses a computer or an electronic system.

BACKGROUND OF THE INVENTION

A computer or an electronic system usually requires storage devices for storing the data and information that it processes and needs to support its operations. These storage devices may be internally mounted within the housing or external to the computer or electronic system.

As computer and electronic system components become smaller, the enclosures that house these systems also become smaller. The advantage of reducing the size of such systems is for ease of transportation, installation, reduced total power consumption, and reduced office space consumption.

Any given computer system is designed to fit any variety of customer applications. Some of these applications require relatively little disk storage and others a great amount. The object of any computer design is to fill as many needs as reasonably possible without making the system excessively large or expensive. For many applications, this results in the need for varying amounts of external storage. Directly connected external storage devices are usually located adjacent to the computer or electronic system, but even short cables negatively impact the reliability and performance of such external storage devices.

To properly protect the environment from contamination from noise contained within the cables connected to the external storage devices, and to protect that data within the cable from possible corruption from outside noise, the cable run must be shielded in some way. However, such shielding significantly contributes to the difficulty in designing a reliable and cost efficient electrical data connection.

One of the advantages, however, in using external storage devices is that there is no practical limit in the number of storage devices that may be connected to the computer or electronic system. Therefore, as long as there are unused input/output ("I/O") ports, storage devices may be added to increase the system's storage capacity.

Computer housings have shielding associated with them. Therefore, when storage devices are internally mounted, interference and noise internal to the housing that they generate will not radiate to the external environment. However, there are a number of problems associated with internally mounting storage devices. A few of these problems are the limitation on the number of storage devices that can be mounted to a storage assembly because of the space constraints, the existence of lengthy electrical stubs associated with a common bus, difficulty in providing clean power to the storage devices, the ability to easily expand a system's storage capacity, the difficulty in cooling the storage devices, and the ability to isolate the storage devices from external sources of physical shock and vibration.

Conventional storage assemblies generally do not employ methods which permit more than a few storage devices to be internally mounted on a storage assembly. For example, some conventional storage assemblies only permit one storage device to be connected to them. In many cases it is desirable to provide a storage assembly that accommodates the connection of a number of storage devices.

Internally mounted storage devices, which are conventionally connected to a computer or an electronic system, often have lengthy stubs associated with the connection of storage devices to a common bus. Because of the transmission line effects, the introduction of lengthy stubs limit the maximum configuration and reliability of the common bus that connects to all of the storage devices. It is desirable to have a storage assembly that is not plagued with the stub problem.

Modern storage devices require high current and high speed changes in current. These operational power needs for internally mounted storage devices are not satisfied with conventional techniques for providing power because such operational power needs of modern storage devices exceed the capability of conventional power distribution methods. Thus, it is desirable to have a storage assembly that can satisfy the required operational power needs of modern storage devices.

There also has been difficulty is expanding the storage capacity of computer or electronic systems beyond that which is provided by the internally mounted storage devices. It fact, many systems with internally mounted storage devices are not expandable at all.

The expansion problem also is manifest in individual storage assemblies being part of a larger storage assembly with all of the individual assemblies being connected by a common bus. Such a configuration cannot be readily expanded because of the difficulty in making bus and other connections without adversely affecting the system.

The present invention provides an storage assembly that overcomes these and other problems as will be set forth in detail in the remainder of the specification and shown in the drawings.

SUMMARY OF THE INVENTION

The present invention is a storage assembly that may be used for internally mounting storage devices in a computer or an electronic system, and that may be used as an external port.

The storage assembly of the present invention has an assembly base that preferably is rectangular in shape. The assembly base has a mounting structure for a local disk converter ("LDC") board. This mounting structure is disposed perpendicular to the plane of the assembly base. The LDC board includes circuitry for providing tightly regulated DC power to the storage devices mounted immediately adjacent to the storage assembly.

The assembly base also has a mounting structure for an interface board for connection to the main storage backplane. This mounting structure is disposed perpendicular to the plane of the assembly base in the same direction as the LDC board mounting structure. The interface board mounting structure receives a mechanically floating interface board mounting bracket that in turn receives an interface board.

A lower tray that is disposed above the base assembly has storage devices attached to it. An upper tray, which also has storage device attached to it, is connected to, and stacked above, the lower tray. When these two trays are stacked, there is space between them in which the storage devices attached to the lower tray reside. When the stacked trays of storage devices are assembled, provisions are made for mounting them on the assembly with shock mount assemblies.

The shock mount assemblies are configured to absorb, with regard to the stack of trays containing storage devices, any shock and vibration experienced by the assembly base. The shock mount assemblies also limit movement of the stack of trays carrying storage devices in the horizontal, vertical, and angular directions.

The connector at a first end of a cable assembly connects to the I/O connector of the interface board. The cable assembly, thereafter, in a daisy chain fashion, connects to the respective buses of the storage devices supported by the storage assembly. The daisy chain connection to the storage devices eliminates stubs. A separate bus is used for each storage assembly, greatly increasing the potential external storage expansion.

The connector at the other end of the cable assembly may be connected to a terminator or external devices. For example, the connector at the other end of the cable assembly may be connected to other storage devices which will permit an expansion of the storage capacity of the computer or electronic system.

The storage assembly of the present invention may have from "0" to "N" storage devices connected to it on "1" to "M" trays. The only limitations with regard to the number of storage devices that may be connected to the storage assembly are the physical size of the trays and storage devices, the available space in the housing, and construction and strength of the shock mount assemblies.

A detailed description of the storage assembly of the present invention will be provided in the remainder of the specification referring the drawings.

BRIEF DESCRIPTION OF THE DRAWINGS

FIG. 1 is an exploded view of the storage assembly of the present invention.

FIG. 2 is a perspective view of the assembly base and shock mount assemblies of the storage assembly of the present invention shown in FIG. 1.

FIG. 3 is a cross-sectional view of a shock mount assembly and its relationship to the lower tray for carrying storage devices and the assembly base.

FIG. 4 is a perspective view of a mechanically floating interface board bracket of the storage assembly of the present invention shown in FIG. 1.

DETAILED DESCRIPTION OF THE PRESENT INVENTION

Figure 5A:
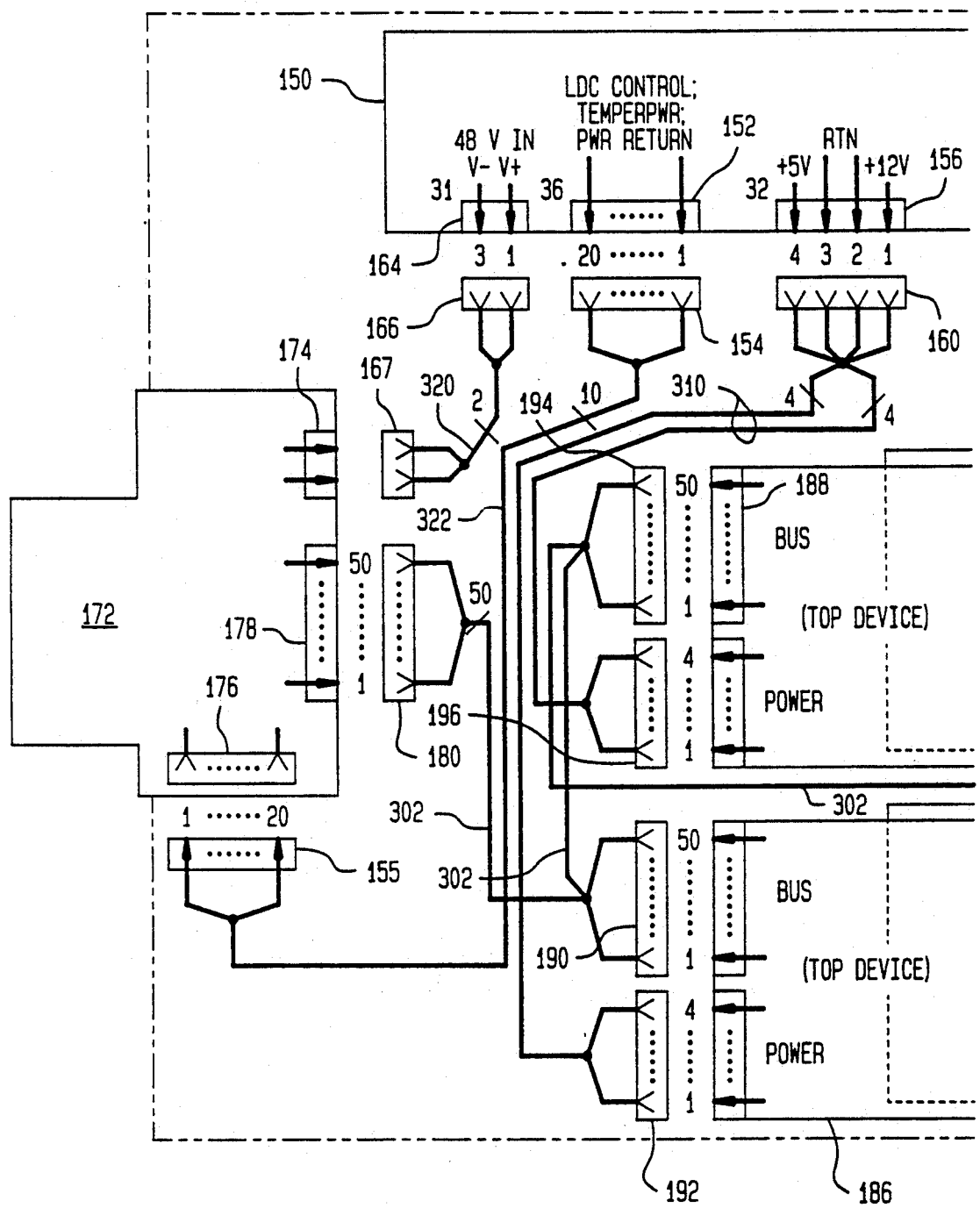
FIGS. 5A, and 5B show an interconnection diagram of the storage assembly of the present invention shown in FIG. 1.

The present invention is a storage assembly for internally mounting storage devices in a housing of a computer or an electronic system.

Referring to FIG. 1, an exploded view of the storage assembly of the present invention is shown generally at 100. The storage assembly has assembly base 102 which is shown in more detail in FIG. 2. Accordingly, the base assembly 102 will be described referring to FIGS. 1 and 2.

Assembly base 102 is rectangular in shape and molded with a waffle configuration to give it increased strength, reduced weight, and increased moldability. Preferably, the assembly base is made from plastic. The assembly base is configured with the appropriate holes for attachment to the housing of the computer or electronic system within which it is disposed.

Disposed from one edge of assembly base 102 is LDC board mounting bracket 104. The LDC board mounting bracket has two upright members 106 and 108. These upright members are disposed perpendicular to the plane of the assembly bases.

LDC board 150 connects to LDC board mounting bracket 104. Specifically, the LDC board has dimensions that permit it to connect to upright members 106 and 108 of LDC board mounting bracket 104. The specific elements of the LDC board and their connections will be discussed subsequently.

Disposed from another edge of assembly base 102 is storage interface board mounting structure 110. Mounting structure 110 has frame 112 that defines rectangular opening 114. Opening 114 receives therein mechanically floating storage interface board mounting bracket 140. This mounting bracket is shown in greater detail in FIG. 4. The connectors and signals associated with the fixed storage interface board mounting bracket will be described subsequently.

Returning to FIG. 1, crudely regulated DC input power is supplied to the LDC board from the computer or electronic system via storage interface board 172. LDC board 150 has connector 164 for receiving the crudely regulated DC input power from storage interface board 172. Storage interface board 172 provides the crudely regulated DC input power to LDC board 150 via cable 320 (FIGS. 5A and 5B). The LDC board has components that convert the crudely regulated input voltage into tightly regulated output voltages. These output voltages are +5 volts and +12 volts (DC). The voltage regulating components of the LDC board are UC 3825's which are commercially available from Unitrode Corporation, Lexington, Mass. LDC board has power connectors 156 and 158 through which the +5 volts and +12 volts supply voltages are supplied to the storage devices mounted on the storage assembly.

The LDC board has connector 152 for receiving control signals from storage interface board 172. Fixed storage interface board 172 supplies control signals to the LDC board over cable 322 (FIGS. 5A and 5B). These signals control the voltage regulation function of the LDC board.

The last connectors on LDC board 150 are POK-/ACOK connectors 168 and 170. Connectors 168 and 170 transmit the POK (power OK) signals to the storage devices and receive the ACOK (AC Power OK) signals from the Main Power Siphon. The POK and ACOK signals are only required when certain types of storage devices are used.

Storage interface board 172 detachably connects to a mechanically floating storage interface board mounting bracket 140. Connector 180 connects to connector 178 of interface board 172. Connector 180 is disposed at a first end cable assembly 302 (FIG. 5A) that connects the storage devices mounted on the storage assembly in a daisy chain fashion.

Storage device brackets 198 and 200 are mounted on lower tray 182 by any suitable means. Even though FIG. 1 shows two storage device brackets being mounted on lower tray 182, it is to be understood that any number of storage device brackets may be connected to tray 182, space permitting.

Upper tray 184 is connected to, and stacked above, lower tray 182. Storage device storage device brackets 186 and 188 are attached to upper tray 184 in any suitable manner, as previously mentioned.

When upper tray 184 is stacked above, and connected to, lower tray 182, and storage devices are disposed in storage device brackets 186, 188, 198, and 200 that are fixed to the two trays, shock mount assemblies 116, 118, 120, and 122 can be disposed between lower tray 182 and assembly base 102 to provide shock and vibration protection for the storage devices disposed on lower tray 182 and upper tray 184. The shock mount assemblies permit the entire stack of storage devices to move, or sway, together. Although only two trays for mounting storage devices is shown in FIG. 1, it is understood that "0" to "N" storage devices may be disposed on trays that are part of the storage assembly of the present invention. The only limitations as to the number of storage devices that may be mounted on the storage assembly are the size of the trays and storage devices, the space available, and the stress limits of the shock mount assemblies.

Shock mount assemblies 116, 118, 120, and 122 are highly damped, low frequency assemblies that absorb, with respect to the stacked trays storage devices, both shocks and vibrations experienced by the base assembly. Shock mount assemblies 116, 118, 120, and 122 as shown in FIG. 2 have the same configuration. Accordingly, shock mount assembly 116 which is shown in FIG. 3 is representative of all of the shock mount assemblies. Therefore, in describing shock mount assembly 116, the reference numbers for assemblies 118, 120, and 122 will follow in parenthesis.

Referring to FIG. 3, shock mount assembly 116 (118, 120, 122) includes isolator 250 (256, 262, 268) isolator opening 254 (260, 266, 272) in assembly base 102, and O-ring 253 (259, 265, 271). Isolator 250 (256, 262, 268) has threaded opening 251 (257, 263, 269) in the top and stud 252 (258, 264, 270) integrally formed at the bottom. Stud 252 (258, 264, 270) has threaded member 276 (264, 277, 278, 279) extended from the bottom. Threaded member 276 (277, 278, 279) of stud 252 (258, 264, 270) is screwed into threaded bore 255 (261, 267, 273) of assembly base 102.

Isolator 250 (256, 262, 268) is fixed to the bottom surface of tray 182 by screw 282 (not shown for assemblies 118, 120, 122) that extends through opening 280 (not shown for assemblies 118, 120, 122) and screws into threaded opening 251 (257, 263, 269) of isolator 250 (256, 262, 268). Preferably, isolator 250 (256, 262, 268) is constructed from chlorobutyl rubber that is available from Lord Corporation, Erie, Pa.

As shown, isolator 250 (256, 262, 268) is disposed in isolator opening 254 (260, 266, 272) in assembly base 102. The outside diameter of isolator 250 (256, 262, 268) is sufficiently less than inside diameter of isolator opening 254 (260, 266, 272) to permit horizontal and angular movement of isolator 250 (256, 262, 268) in isolator opening 254 (260, 266, 272).

In absorbing normal shocks and vibrations, isolator 250 (256, 262, 270) does not contact the walls of opening 254 (260, 266, 272). If large shocks are experienced in the horizontal or angular directions, isolator 250 (256, 262, 268) may contact the walls of isolator opening 254 (260, 266, 272). The cooperative action between the isolator and the isolator opening walls permits large shocks to be absorbed while protecting against the isolator exceeding its stress limits.

O-ring 253 (259, 265, 271) is disposed between the top edge of isolator opening 254 (260, 266, 272) and the bottom surface of lower tray 182. O-ring 253 (259, 265, 271) prevents the bottom of tray 182 from hitting the top surface of assembly base 102 when large vertical shocks are experienced. Except when large shocks are experienced, there is clearance between the O-ring and the bottom of lower tray 182. Preferably, O-ring 253 (259, 265, 271) is made from Buna-N rubber from a Green Rubber Corporation, Cambridge, Mass.

Figure 5:
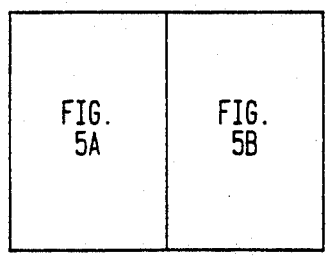
Figure 5B:
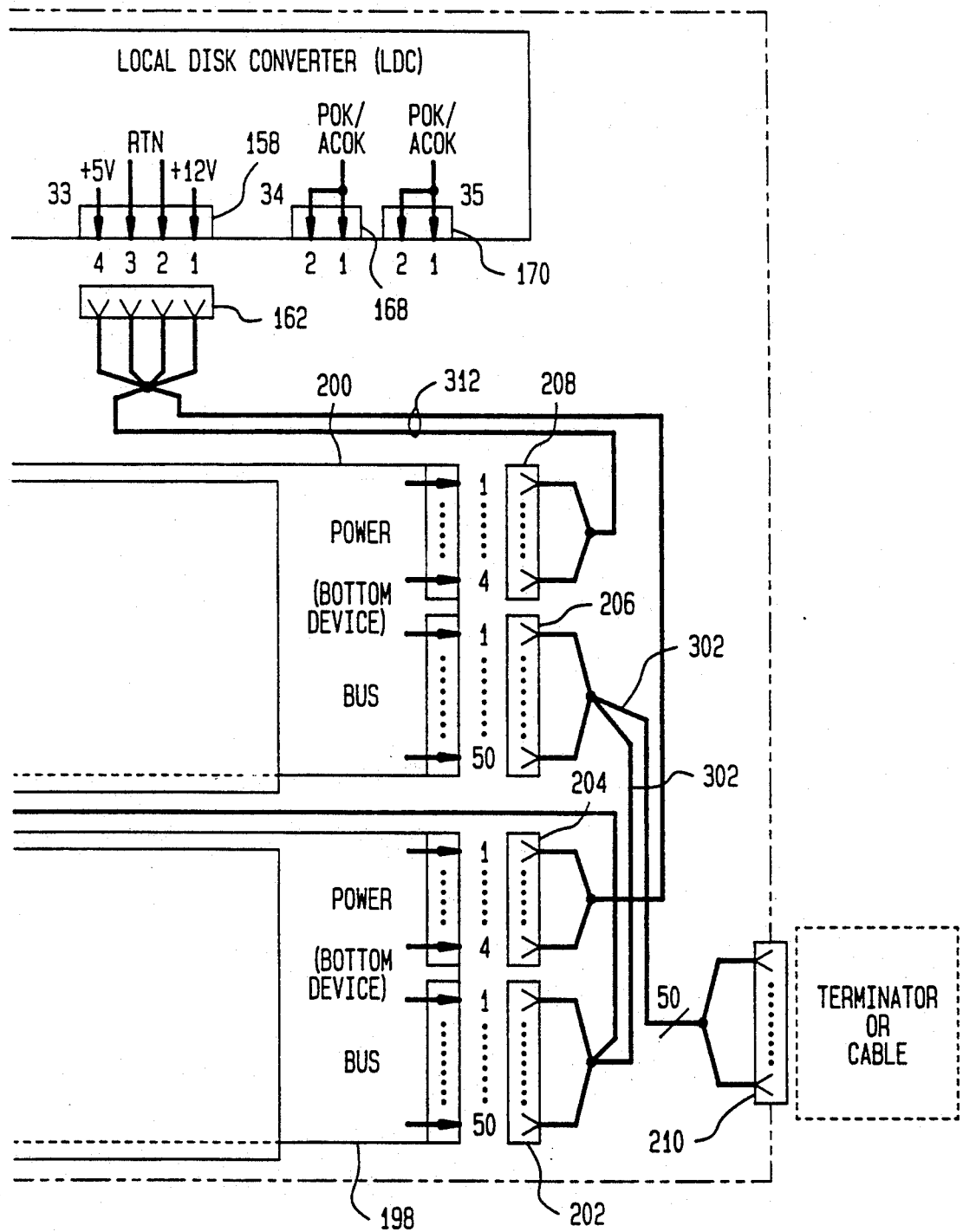

Referring to FIGS. 1 and 5, as stated, cable assembly 302 connects to each of the storage devices that are mounted on the storage assembly of the present invention. This daisy chain connection of cable assembly 302 to the storage devices may be, for example, the cable assembly, after leaving connector 180, connects to data connector 190, next it connects to data connector 194, following this it connects to data connector 202, after this it connects to data connector 206, and finally it reaches the other end of the cable assembly where connector 210 is disposed. The terminal connector may be disposed at the frontplane or backplane of the system housing.

Signals transmitted on the cable assembly from storage interface board 172 are provided to all of the buses at the same time. Furthermore, when signals are transmitted from a storage device, it is done over one of the separate buses without affecting the buses of other storage devices.

The daisy chain connection configuration for each storage device permit the storage assembly of the present invention to be able to be used as a port to external devices. This capability is manifest in the ability of the storage assembly to transmit signals from connector 180 to the connector 210 without accessing any storage devices.

Referring specifically to FIGS. 5A and 5B, all of the interconnections of the storage system elements will now be described.

Storage interface board 172 provides power to LDC board 150 via cable 320. The cable has connector 167 that connects to the power output terminal 174 of the interface board and connector 166 that connects to LDC board power input connector 164.

Storage interface board 172 provides a crudely regulated 48 volt (DC) supply voltage to LDC board 150. The LDC board processes the 48 volt supply voltage and provides clean, tightly regulated +5 volt and +12 volt supply voltages for input to the storage devices.

Storage interface board 172 provides signals for controlling operation of LDC board 150. These signals are output from output connector 176 of the interface board and transmitted via cable 322 to input connector 152 of LDC board 150. Connector 155 of cable 322 connects to output connector 176 of the interface board and connector 154 of the cable connects to input connector 152 of the LDC board.

Storage interface board I/O bus connector 178 is used to transmit data signals to, and receive data signals from, the storage devices, or external devices connected to terminal connector 210. Connector 180 of cable assembly 302 connects to I/O bus connector 178.

Cable assembly 302, with connector 180 at one end and connector 210 at the other, connects to data connectors 190, 194, 202, and 206 in a daisy chain fashion. Connector 210, which may be disposed at the output of the storage assembly or electronic system in which the storage assembly of the present invention is mounted, as shown in FIGS. 5A and 5B, may be connected to a terminator, or a cable that connects to an external device.

Each data connector 190, 194, 202, and 206 connects to a separate bus. Each of these buses connects to a storage device that is mounted on the storage assembly of the present invention. Accordingly, each storage device has its own bus, as shown in FIGS. 5A and 5B.

The regulated power output for connectors 156 and 158 of LDC board 150 is provided to the two cable assemblies. Specifically, output connection 156 connects to connector 160 of cable assembly 310, and output connector 158 connects to connector 162 of cable assembly 312. As shown in FIGS. 5A and 5B, each of the cable assemblies supplies power to two storage devices. That is, cable assembly 310 supplies power to the storage devices in receivers 186 and 188 via connectors 192 and 196, respectively; and, similarly, cable assembly 312 supplies power to the storage devices in receivers 198 and 200 via connectors 204 and 208, respectively.

The storage assembly of the present invention may support "0" storage device on trays of the storage assembly when it is used as a port only or up to "N" storage devices on trays depending upon the previously discussed limitations.

LDC board 150 also has POK/ACOK connectors 168 and 178. As stated, these connectors may connect to cables assemblies 310 and 312 when certain types of storage devices are supported by the storage assembly of the present invention. When these storage devices are supported by the storage assembly of the present invention, the POK signals are sent to such storage devices when power is being provided. The ACOK signal is provided to indicate that the storage devices are properly powered.

The terms and expressions which are employed herein are used as terms of expression and not of limitation. And, there is no intention, in the use of such terms and expressions, of excluding the equivalents of the features shown, and described, or portions thereof, it being recognized that various modifications are possible within the scope of the invention.

What is claimed is:

1. An apparatus for storing storage devices, comprising:
   a base;
   a storage device supporter for supporting a plurality of storage devices, the storage device supporter including at least two trays, each of the at least two trays for supporting one or more of the plurality of storage devices, each of the at least two trays being stacked, being in contact with, and being connected to an adjacent one of the at least two trays; and
   a movable connector for connecting the storage device supporter to the base, with the movable connector including a shock absorber.

2. The apparatus as recited in claim 1, wherein the apparatus further includes a power supply attached to the base, the power supply for powering the plurality of storage devices.

3. The apparatus as recited in claim 1, wherein the base has a waffle configuration.

4. The apparatus as recited in claim 1, wherein the apparatus further includes a storage device connector for connecting the plurality of storage devices in a daisy chain.

5. The apparatus for storing storage devices according to claim 1, wherein the shock absorber includes
   an isolator disposed in a cavity in the base, the isolator including a fastener for connecting the isolator to the one of the at least two trays adjacent to the base;
   at least two O-rings located between the base and the one of the at least two trays adjacent to the base, the at least two O-rings limiting the movement of the isolator.

6. An apparatus for storing 2 to N storage devices, where N is an integer greater than 2, comprising:
   a base;
   at least two storage device supporters for supporting the 2 to N storage devices, each of the at least two storage device supporters being stacked, being in contact with, and being connected to an adjacent one of the at least two storage device supporters;
   a movable connector for connecting the at least two storage device supporters to the base, with the movable connector including a shock absorber.

7. The apparatus as recited in claim 6, wherein each of the storage device supporters includes a tray.

8. The apparatus as recited in claim 6, wherein each storage device supporter is for supporting 1 to M storage devices, where M is an integer greater than 1.

9. The apparatus as recited in claim 6, wherein the apparatus further includes a storage device connector for connecting the 2 to N storage devices in a daisy chain.

10. The apparatus as recited in claim 6, wherein the apparatus further includes a power supply attached to the base, the power supply for powering the plurality of storage devices.

11. The apparatus as recited in claim 6, wherein the base has a waffle configuration.

12. An apparatus for storing storage devices, comprising:
   a base;
   a storage device supporter for supporting a plurality of storage devices, the storage device supporter including at least two trays, each of the at least two trays for supporting one or more of the plurality of storage devices, each of the at least two trays being stacked, being in contact with, and being connected to an adjacent one of the at least two trays;
   a movable connector for connecting the storage device supporter to the base, with the movable connector including a first shock absorber; and
   a second shock absorber disposed between the base and the movable connector.

13. The apparatus as recited in claim 12, wherein the second shock absorber includes an O-ring.

14. An apparatus for storing storage devices, comprising:
   a base;
   a plurality of storage device supporters for supporting a plurality of storage devices, each storage device supporter including at least two trays, each of the at least two trays for supporting one or more of the plurality of storage devices, each of the at least two trays being stacked, being in contact with, and being connected to an adjacent one of the at least two trays, each of the plurality of storage device supporters being stacked, being in contact with, and being connected to an adjacent one of the plurality of storage device supporters;

a movable connector for connecting the plurality of storage device supporters to the base with the movable connector including a first shock absorber; and a second shock absorber disposed between the base and movable connector.

15. The apparatus as recited in claim 14, wherein the second shock absorber includes an O-ring.

16. An apparatus for storing storage devices, comprising:

a base;

a storage device supporter for supporting at least two storage devices, the storage device supporter including at least two trays, each of the at least two trays for supporting one or more of the at least two storage devices, each of the at least two trays being stacked, being in contact with, and being connected to an adjacent one of the at least two trays;

a movable connector for connecting the storage device system to the base, with the movable connector including a shock absorber and means for limiting movement of the shock absorber.

17. The apparatus as recited in claim 16, wherein the movable connector includes a member spaced away from the shock absorber for limiting movement of the shock absorbing means in predetermined directions.

18. The apparatus as recited in claim 17, wherein the apparatus includes a second shock absorber disposed between the base and the movable connector.

19. An apparatus storing storage devices, comprising:

a base;

a plurality of storage devices;

a storage device supporter for supporting the plurality of storage devices, the storage device supporter including at least two trays, each of the at least two trays for supporting one or more of the plurality of storage devices, each of the at least two trays being stacked, being in contact with, and being connected to an adjacent one of the at least two trays; and a movable connector for connecting the storage device supporter to the base, with the movable connector including a shock absorber.

20. The apparatus as recited in claim 19, wherein the plurality of storage devices include one or more disk drives.

21. The apparatus as recited in claim 20, wherein the apparatus further includes a disk drive connector for connecting the plurality of disk drives in a daisy chain.

22. An apparatus storing 2 to N storage devices, where N is an integer greater than 2, comprising:

a base;

2 to N storage devices;

at least two storage device supporters for supporting the 2 to N storage devices, each of the at least two storage device supporters being stacked, being in contact with, and being connected to an adjacent one of the at least two storage device supporters;

a movable connector for connecting the at least two storage device supporters to the base, with the movable connector including a shock absorber.

23. The apparatus as recited in claim 22, wherein the storage devices include disk drives.

24. The apparatus as recited in claim 23, wherein the apparatus further includes a disk drive connecter for connecting the 2 to N disk drives in a daisy chain.

* * * * *